United States Patent
Hennis et al.

(10) Patent No.: US 7,435,369 B2
(45) Date of Patent: Oct. 14, 2008

(54) METHOD FOR TARGETED DELIVERY OF ADDITIVES TO VARYING LAYERS IN GYPSUM PANELS

(75) Inventors: Mark E. Hennis, Indian Rocks Beach, FL (US); Michael P. Fahey, St Petersburg, FL (US); Robert J. Hauber, Lutz, FL (US); Matthew J Chowing, Cody, WY (US); Gerald D. Boydston, Cody, WY (US); Troy R. Stuart, Cody, WY (US)

(73) Assignee: BPB plc, Sloug (GB)

( * ) Notice: Subject to any disclaimer, the term of this patent is extended or adjusted under 35 U.S.C. 154(b) by 755 days.

(21) Appl. No.: 10/968,680

(22) Filed: Oct. 19, 2004

(65) Prior Publication Data

US 2005/0121131 A1    Jun. 9, 2005

Related U.S. Application Data

(60) Continuation-in-part of application No. 09/997,446, filed on Nov. 30, 2001, now Pat. No. 6,878,321, which is a division of application No. 09/875,733, filed on Jun. 6, 2001, now Pat. No. 6,524,679.

(51) Int. Cl.
*B28B 5/02* (2006.01)
*B28B 23/18* (2006.01)

(52) U.S. Cl. .................. 264/129; 264/255; 264/256; 264/261; 264/295; 264/339; 156/39; 156/41; 156/256

(58) Field of Classification Search ............ 156/39, 156/41, 45, 202, 216, 221, 280, 346; 264/129, 264/255, 256, 261, 295, 339; 52/408, 309.1, 52/309.12, 309.17, 481
See application file for complete search history.

(56) References Cited

U.S. PATENT DOCUMENTS

| 1,439,954 | A | * | 12/1922 | Emerson | .................. 428/140 |
| 1,578,250 | A | | 3/1926 | Armstrong | |
| 1,654,024 | A | | 12/1927 | Turner | |
| 2,213,442 | A | | 9/1940 | Elliott | |
| 3,516,882 | A | * | 6/1970 | Cummisford | ................ 156/39 |
| 3,578,517 | A | | 5/1971 | Lapp et al. | |
| 3,915,919 | A | | 10/1975 | Nishioka et al. | |
| 3,944,698 | A | * | 3/1976 | Dierks et al. | ................ 428/219 |
| 3,993,822 | A | * | 11/1976 | Knauf et al. | ................ 428/213 |
| 4,105,383 | A | | 8/1978 | Hanson | |

(Continued)

FOREIGN PATENT DOCUMENTS

| CA | 09193779 | 7/1926 |
| CA | 0794590 | 9/1968 |
| DE | 878 837 | 6/1953 |
| DE | 1033123 | 6/1958 |
| DE | 1223287 | 8/1966 |
| EP | 0518156 | 12/1992 |

(Continued)

*Primary Examiner*—José A Fortuna
(74) *Attorney, Agent, or Firm*—Vangelis Economou IPHorgan, Ltd.

(57) ABSTRACT

A method of manufacture of multilayer gypsum board, and a gypsum additive delivery system, including wet gypsum board passing through a board forming station in which additives are delivered to one or more layers of a multi layered gypsum board panels, such as engineered polymers, providing a better and more water resistance surface. Preferably, the gypsum board has a first layer of a mixture of set gypsum having an outer surface and a polymeric compound or wax emulsion additive entrained therein and impregnated in a thin sheet of randomly aligned inorganic fibers to essentially encase the core gypsum within two facing layers.

26 Claims, 6 Drawing Sheets

U.S. PATENT DOCUMENTS

| | | | |
|---|---|---|---|
| 4,265,979 A * | 5/1981 | Baehr et al. | 428/171 |
| 4,288,263 A * | 9/1981 | Delcoigne et al. | 156/42 |
| 4,303,722 A | 12/1981 | Pilgrim | |
| 4,350,736 A | 9/1982 | Reily | |
| 4,378,405 A | 3/1983 | Pilgrim | |
| 4,420,299 A | 12/1983 | De Mets | |
| 4,444,595 A | 4/1984 | Baines et al. | |
| 4,450,022 A | 5/1984 | Galer | |
| 4,477,300 A | 10/1984 | Pilgrim | |
| 4,488,917 A | 12/1984 | Porter et al. | |
| 4,572,861 A | 2/1986 | Barretto-Garcia et al. | |
| 4,630,419 A | 12/1986 | Pilgrim | |
| 4,647,496 A | 3/1987 | Lehnert et al. | |
| 4,793,892 A | 12/1988 | Miller et al. | |
| 4,810,569 A | 3/1989 | Lehnert et al. | |
| 4,816,091 A * | 3/1989 | Miller | 156/42 |
| 5,221,386 A | 6/1993 | Ensminger et al. | |
| 5,319,900 A | 6/1994 | Lehnert et al. | |
| 5,350,554 A * | 9/1994 | Miller | 264/171.11 |
| 5,371,989 A | 12/1994 | Lehnert et al. | |
| 5,395,685 A | 3/1995 | Seth et al. | |
| 5,397,631 A * | 3/1995 | Green et al. | 428/219 |
| 5,437,722 A | 8/1995 | Borenstein | |
| 5,476,567 A * | 12/1995 | Fujisawa et al. | 156/281 |
| 5,549,859 A | 8/1996 | Andersen et al. | |
| 5,552,187 A | 9/1996 | Green et al. | |
| 5,644,880 A * | 7/1997 | Lehnert et al. | 52/408 |
| 5,704,179 A | 1/1998 | Lehnert et al. | |
| 5,714,032 A | 2/1998 | Ainsley et al. | |
| 5,718,797 A | 2/1998 | Phillips et al. | |
| 5,804,615 A | 9/1998 | Schreiber et al. | |
| 5,968,237 A | 10/1999 | Sinnige | |
| 5,981,406 A | 11/1999 | Randall | |
| 6,001,496 A | 12/1999 | O'Haver-Smith | |
| 6,054,205 A | 4/2000 | Newman et al. | |
| 6,110,575 A | 8/2000 | Haga | |
| 6,187,409 B1 | 2/2001 | Mathieu | |
| 6,190,476 B1 | 2/2001 | Seecharan et al. | |
| 6,475,313 B1 * | 11/2002 | Peterson et al. | 156/39 |
| 6,492,450 B1 | 12/2002 | Hsu | |
| 6,508,895 B2 * | 1/2003 | Lynn et al. | 156/39 |
| 6,524,679 B2 | 2/2003 | Hauber et al. | |
| 6,588,172 B2 | 7/2003 | Porter | |
| 6,737,156 B2 | 5/2004 | Koval et al. | |
| 6,770,354 B2 | 8/2004 | Randall et al. | |
| 6,808,793 B2 | 10/2004 | Randall et al. | |
| 6,878,321 B2 * | 4/2005 | Hauber et al. | 264/129 |
| 6,890,976 B2 | 5/2005 | Sinnige | |
| 7,105,587 B2 | 9/2006 | Tagge et al. | |
| 7,297,396 B2 * | 11/2007 | Wang et al. | 428/292.7 |
| 2002/0095893 A1 | 7/2002 | Walters et al. | |
| 2002/0117559 A1 * | 8/2002 | Kaligian et al. | 239/413 |
| 2002/0187296 A1 * | 12/2002 | Hauber et al. | 428/68 |
| 2002/0187297 A1 * | 12/2002 | Hauber et al. | 428/70 |
| 2002/0187298 A1 * | 12/2002 | Hauber et al. | 428/70 |
| 2005/0121131 A1 * | 6/2005 | Hennis et al. | 156/41 |
| 2005/0159057 A1 * | 7/2005 | Hauber et al. | 442/42 |
| 2005/0161853 A1 * | 7/2005 | Miller et al. | 264/109 |
| 2007/0122604 A1 * | 5/2007 | Wang et al. | 428/294.7 |

FOREIGN PATENT DOCUMENTS

| | | |
|---|---|---|
| EP | 0640674 | 3/1995 |
| EP | 69702115 | 3/1996 |
| GB | 0 490 667 | 8/1938 |
| GB | 0772581 | 4/1957 |
| GB | 1 146 506 | 3/1969 |
| GB | 1250713 | 10/1971 |
| GB | 1344479 | 1/1974 |
| GB | 2053779 | 2/1981 |
| GB | 2225599 | 6/1990 |
| GB | 0427063 | 1/1994 |
| GB | 2316693 | 3/1998 |
| GB | 2316693 A * | 3/1998 |
| WO | 9809033 | 3/1998 |
| WO | 9832579 | 7/1998 |
| WO | WO 2006064377 A2 * | 6/2006 |

* cited by examiner though the invention is not limited to a particular number of layers.

METHOD FOR TARGETED DELIVERY OF ADDITIVES TO VARYING LAYERS IN GYPSUM PANELS

CROSS-REFERENCE TO RELATED APPLICATIONS

This is a continuation-in-part of U.S. patent application Ser. No. 09/997,446 filed on Nov. 30, 2001, issued as U.S Pat. No. 6,878,321 on Apr. 12, 2005, which is a division of U.S. patent application Ser. No. 09/875,733, filed on Jun. 6, 2001, issued as U.S. Pat. No. 6,524,679 on Feb. 25, 2003.

BACKGROUND OF THE INVENTION

1. Field of the Invention

This invention relates generally to gypsum board and its manufacture, and more specifically, relates to gypsum board having at least one face or surface capable of receiving and adhering to polymeric coatings and a manufacturing process permitting the targeted delivery of the polymeric coatings to specified locations.

2. Background Art

Gypsum board, and its production, has received attention in the building industry, and especially for providing an easily worked building material the consistency of which is available for general construction use. Desirable characteristics for gypsum board also include a smooth working surface, consistent thickness throughout, and the ability to provide finishing enhancements, such as paint or other protective coverings, thereon.

Recent developments in the manufacture of gypsum board have also added to the durability and versatility of the uses to which gypsum boards may be put. For a fuller discussion of the developments in the building board field is known as glass reinforced gypsum (GRG) board, reference is made to the aforementioned U.S. Pat. No. 6,524,679, commonly owned with the present invention, and incorporated by reference has if fully disclosed herein.

Manufacturing facilities for the production of gypsum board, whether or not glass mats are utilized for the structural facings, are capital intensive in the costs of space, equipment and in the down time during which a gypsum board production line is reconfigured. For production of a variety of gypsum board products, for example, standard paper faced gypsum board, glass mat backed board, etc., down time of the production line represents a significant cost in the delay of production of gypsum board and in time wasted by production workers who remain idle.

It has been further found that further finishing, e.g., painting of a smooth gypsum board surface, is made easier because the need for additional prefinishing steps, such as priming, etc., may be minimized.

In addition, gypsum products, e.g., wallboard, tile, block, casts and the like, have relatively little resistance to water when not modified by some chemical or physical modification to address the problem of water absorption by the gypsum board. When gypsum wallboard, for example, is immersed in water, the board may quickly absorb a considerable amount of water, lose a great deal of its integrity and structural strength, and distort or swell in different places. Many attempts have been made in the past to improve the water resistance of gypsum products by adding waterproofing materials within the gypsum slurry. The most common waterproofing material being used is a hydrophobic emulsion, usually an emulsion comprising wax, paraffin, asphalt or a silicone compound, e.g., silanes and siloxanes.

As can be expected, modification of gypsum slurry to render it water resistant adds to the cost of gypsum production, both in terms of the cost of the added substance, and in terms of the additional equipment necessary to mix and deliver the water resisting compounds to the gypsum slurry before application. Thus, it has been found desirable to provide a gypsum board and manufacturing process thereof which can be manufactured at relatively high speed, has high structural integrity and strength by virtue of using a mat of relatively low diameter fibers, and may include in a face coating a polymeric additive material providing a surface ideal for further finishing of the gypsum board, in addition to a means for delivering the water resistant material targeted to the location on the gypsum board where it would be most useful, that is on the surface of the finished gypsum board product. While the water resistant capability is desirable for all of the gypsum layers in a gypsum board, it is now possible to target specified layers of a multiplayer gypsum board that is made in accordance with the aforementioned U.S. Pat. No. 6,524,679, and other multilayer boards.

As a result of further development obtained through practice and further consideration of the concepts disclosed and claimed the aforementioned U.S. Pat. No. 6,524,679, it has been found additionally desirable to provide a means for delivering specific desired additives to a specified multilayer density layer of a gypsum board panel, in order to obtain specified desirable properties. For example, it has been found desirable to increase the water resistance of the outer face surface of a glass mat gypsum panel made in accordance with the teachings in the aforementioned U.S. Pat. No. 6,524,679. Moreover, in accordance with the teachings of that patent, the additives should only be targeted to that layer, for example, the dense slurry layer, in which it is desirable to provide the desired characteristic, so as to avoid unnecessary cost and weight to the final board panel by adding costly and sometimes denser additives to layers of the gypsum board that will not provide as much benefit as those to which the additives are targeted.

SUMMARY OF THE INVENTION

The present invention seeks to provide an improved gypsum product and process therefor. In the present invention, contrary to the prior art, the gypsum product is made by adding a hydrophobic (that is, water repelling or resisting, the terms being used interchangeably) substance, such as, but not limited to, paraffin, wax, siloxanes and the like, in specified locations of the gypsum board where the water repellent properties are most useful, that is, at the surface and edges of the board. There is additionally provided in accordance with an embodiment of the present invention a method for providing water resistance to a predetermined surface of a gypsum product, the method comprising adding a hydrophobic substance to gypsum slurry that is directed to a specified location on the gypsum board.

Accordingly there is disclosed and claimed herein a method of manufacture of gypsum board having fiber face sheets, comprising the steps of providing a first gypsum slurry having a first consistency continuously passing through a first gypsum slurry transport receptacle, depositing a predetermined amount of said first gypsum slurry onto at least a first continuous inorganic fiber face sheet, transporting said first continuous fiber sheet through a gypsum application station, providing a second gypsum slurry having a second consistency and depositing said second gypsum slurry onto said first fiber sheet and causing said second gypsum slurry to be essentially evenly distributed over an upwardly facing top surface of said first fiber sheet, providing a third gypsum slurry having a third consistency and depositing it onto a second of said continuous fiber sheets, said second inorganic fiber sheet having top and bottom surfaces, thereby coating said top surface of said second fiber sheet with said third gypsum slurry, homogeneously mixing an additive into one of said first, second or third slurries, prior to the steps of providing the gypsum slurries, applying said second inorganic fiber sheet onto the second gypsum slurry thereby sheathing said second gypsum slurry within said first and second fiber sheets to form a wet gypsum board product.

For use with an inorganic fiber, such as that disclosed in aforementioned U.S. Pat. No. 6,524,679, the method of manufacture of gypsum board having face sheets comprising inorganic fiber, preferably randomly oriented inorganic fiber, comprises the steps of depositing a predetermined amount of first gypsum slurry having a first consistency onto at least one continuous sheet of randomly aligned inorganic fiber material having random interstices between the fibers by passing at least one continuous inorganic fiber sheet through a gypsum application station, the station including two applicator wheels through which pass the inorganic fiber sheet, so as to cause the first gypsum slurry having a first consistency to penetrate through the random openings between the inorganic fibers and thereby to coat both top and bottom surfaces of the inorganic fiber material with the gypsum having a first consistency, directing the first inorganic material from the gypsum slurry application station to a first forming plate, depositing a second gypsum slurry having a second consistency on the first inorganic fiber material and causing the second gypsum slurry to be essentially evenly distributed over an upwardly facing top surface of the first inorganic fiber sheet, applying a third gypsum slurry having a third consistency to a second of at least one continuous inorganic fiber sheets, and causing the third gypsum slurry to penetrate essentially completely through random interstices in the second inorganic fiber sheet, applying the second inorganic fiber sheet onto the second gypsum slurry thereby sheathing the second gypsum slurry within the first and second inorganic fiber sheet to form a wet gypsum board, passing the wet gypsum board through a board forming station having a lower forming plate and an upper forming plate, the upper forming plate comprising sections and defining at least one predetermined angle relative to the lower forming plate, the vertical separation between the lower plate and at least one section of the upper plate having a predetermined vertical dimension substantially equal to the desired thickness of the manufactured gypsum board. Alternatively, a forming wheel may be utilized to provide gypsum board having a predetermined thickness. Optionally, an edger bar may be used to smooth and otherwise complete the surface finish of the gypsum board. In a second embodiment, the method includes adding one or more polymeric additives to the gypsum slurry of one or both surfaces.

In another embodiment of the present invention, a multi-layer gypsum board comprising a first layer of set gypsum comprising a first layer of a mixture of set gypsum having an outer surface and at least one polymeric compound entrained within the set gypsum, and being impregnated within a thin sheet of randomly aligned inorganic fibers, the outer surface of the sheet being essentially encased within the set gypsum and polymeric compound, a second layer comprised of set gypsum, the set gypsum in the second layer being of a lower density than the set gypsum in the first layer; and a third layer having an outer surface comprising set gypsum impregnated with a second thin sheet of randomly aligned inorganic fibers, the outer surface of the third sheet being essentially encased within the set gypsum of the third layer; the set gypsum in the first being integrally bonded to the gypsum of the second layer and the set gypsum in the second layer being bonded integrally to the gypsum in the third layer.

One feature of the invention is the use of a turbulator mechanism in the additive delivery assembly. In a gypsum board forming device comprising a supply of continuous sheet of material, a gypsum slurry mixer including a gypsum delivery mechanism, disposed at least at one gypsum delivery station for delivering the gypsum slurry onto the continuous sheet, at least one additive assembly connected to an additive fluid feed for adding a homogenous stream of an additive to the first gypsum slurry in a first gypsum slurry transport receptacle, a gypsum core delivery mechanism including a second gypsum slurry transport receptacle, a sheet joining station for joining the continuous sheet to the core gypsum, and a gypsum conveyor line, having a belt with a surface for conveying formed gypsum board from the sheet joining station, the additive assembly including an additive delivery port in fluid communication with the additive fluid feed, a turbulator disposed in-line with the additive fluid feed of at least one of the gypsum delivery mechanisms, the turbulator comprising a fluid constrictor having an outlet, the fluid constrictor outlet being disposed adjacent the gypsum slurry stream being transported through the first gypsum slurry transport receptacle.

DETAILED DESCRIPTION OF THE PREFERRED EMBODIMENTS

Figure 1:
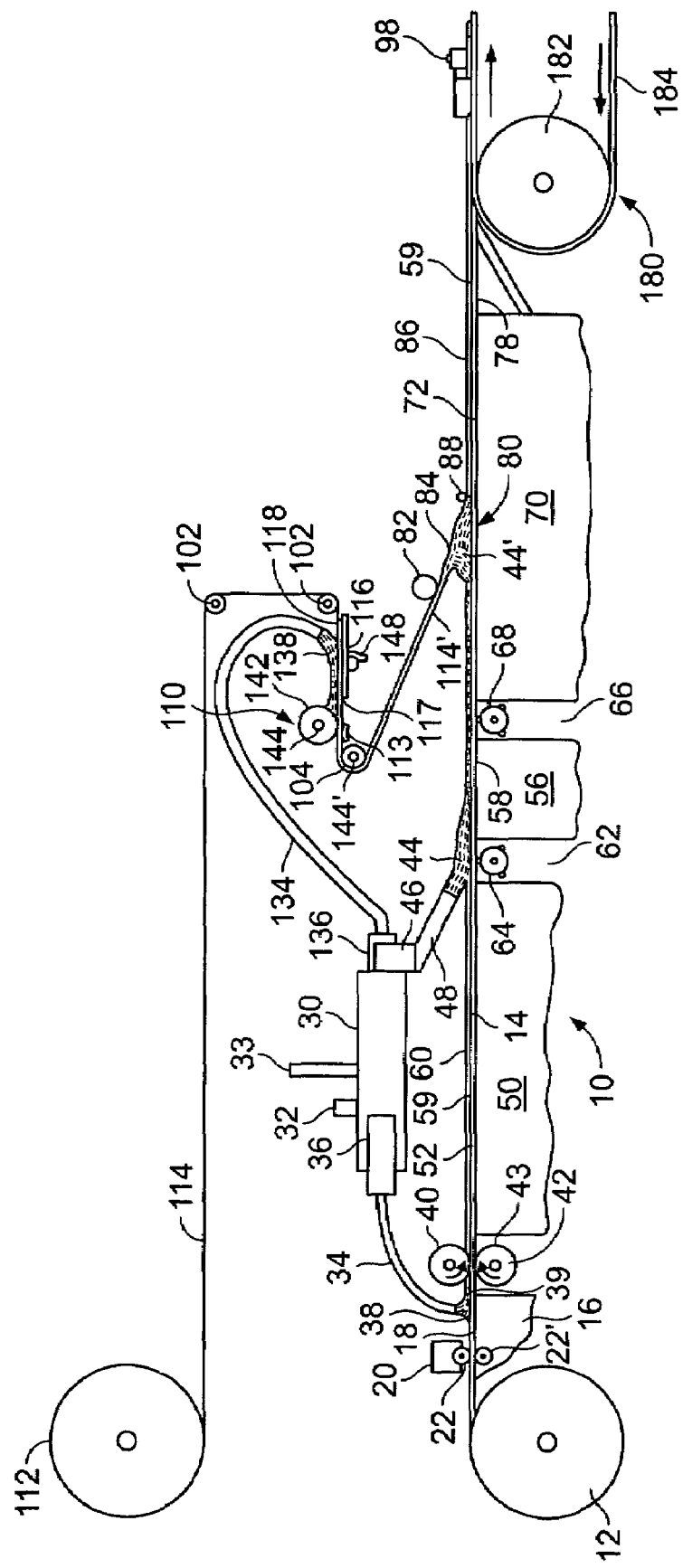
FIG. 1 is a diagrammatical, cross-sectional view of the gypsum board forming station according to the present invention.

In the diagrammatical, cross-sectional illustration of FIG. 1, the board forming station 10 of an inventive embodiment of the inventive plant is shown. Although illustrated in cross-section, the station 10 is shown diagrammatically to clearly depict the separate elements in relation to each other. Modifications to the arrangement are possible and distances between the separate elements are not to scale for simplicity of illustration, but a pragmatic and efficient arrangement will come to mind to a person having ordinary skill in the art.

The inventive plant 10 comprises a supply roll 12 that provides feed of a continuous sheet of facing material that, in the arrangement shown, defines a bottom-facing sheet 14. The supply roll 12 may feed out a sheet comprising any conventional material used in gypsum boards, for example, paper or paper board, but for purposes of the present invention, the material of bottom facing sheet 14 preferably comprises a mat of long inorganic, e.g., glass, fibers which will be more clearly described below with reference to the formation of the inventive gypsum board product, when the inorganic fibers comprise a glasso-glassive fiber, the products being, sometimes referred to herein as glass reinforced gypsum ("GRG") boards.

The supply roll 12 pays out the continuous bottom facing sheet 14 over a first forming table 16, having an upwardly facing surface 18, provides a working surface for further processing of the bottom facing sheet 14. The first forming table 16 also provides a support for creaser wheel assembly 20, disposed athwart the surface 18.

The sheet 14 may be extracted from the supply roll 12 by motion of the sheet being pulled through the board forming station 10 by the belt line, as will be described. The two creaser wheels are vertically disposed within the creaser wheel assembly 20, one set of wheels 22 above the bottom facing sheet 14 cooperate with a second set of wheels, referred to as the wheel anvil 22', below the sheet 14. The creaser wheels 22, 22' rotate on axles and produce partially cut edge creases on the sheet 14 adjacent to each of the longitudinal edges of the bottom-facing sheet 14. The edge creases are spaced to allow varying fold thicknesses and to cause the edges to turn upwardly so as to retain slurry poured onto the bottom-facing sheet 14 downstream of the creaser wheel assembly 20, as is described below.

A continuous mixer 30, accepting raw materials, i.e. stucco, plaster, gypsum (in powder form), water and other additives, through one or more inlets, one of which inlets 32 is shown in FIG. 1. The mixer 30 provides a mixing capacity that formulates a desirable density of wet gypsum slurry by, for example, rotating a mixing blade (not shown) via a drive shaft 33. Because it is a desirable feature for this invention to produce a multi-layer gypsum board, the mixer 30 may comprise separate mixing chambers (not shown in FIG. 1) for providing separate, and different slurry mixtures. A continuous mixer, such as that utilized in this invention, is described and illustrated in commonly-owned U.S. Pat. No. 5,908,521, which is incorporated by reference as if fully set forth herein.

The continuous mixer 30 thus provides several outlets for gypsum slurry each having varying desirable characteristics depending on the function of the slurry layer for which any specific outlet is producing gypsum slurry. Each outlet includes an output control for controlling the amount of gypsum slurry permitted to flow through the outlets and into the gypsum board forming plant. The control may be one or more slurry delivery mechanisms, as described in aforementioned U.S. Pat. No. 5,908,521, which have controlled variable delivery speeds so that only the desired amount of gypsum slurry is pumped through the outlets.

Referring again to FIG. 1, mixer 30 comprises a first slurry outlet 34, controllable by a control device 36, that allows for the continuous flow of a slurry mixture having desirable characteristics, as described in aforementioned U.S. Pat. No. 5,908,521. In this embodiment, mixer 30 is set to provide two types of slurry. Control device 36 delivers a denser gypsum slurry mixture that is ultimately utilized adjacent the facing of the completed gypsum board, as will be described below.

The end of the slurry outlet 34 extrudes the gypsum slurry directly onto the bottom-facing sheet 14, which is continuously moving over the surface 18 of forming table 16. Slurry outlet 34 preferably comprises a rubber boot, but other types of outlets may be used, for example flexible hoses or piping. Preferably, the gypsum slurry 38 is poured onto the upwardly facing surface of the sheet 14 at a position where it is supported by the forming table surface 18, and a predetermined amount of dense gypsum slurry is deposited over the continuously moving sheet 14 so as to coat the internal surface of bottom face sheet 14. It should be noted that this upwardly facing internal surface of sheet 14 is normally destined to be an inner surface of the bottom-facing sheet 14, and will be facing inwardly from the board surface when the gypsum board is fully formed. To ensure that the dense gypsum slurry 38 is evenly spread out over the top surface of the bottom face sheet 14, a set of roller wheels 40, 42, also referred to herein as roll coaters 40, 42, are positioned again vertically over and under the sheet 14. The wheels 40, 42 can rotate in forward or reverse directions.

One advantage and benefit which derives from use of rotating roller wheels 40, 42 is that in addition to providing a smooth, evenly spread surface coating over the mat comprising the bottom facing sheet 14, the dense slurry layer 38 deposited on the inner mat surface is forced, by the top roller wheel 40, to extend through the sheet 14 and to form a structurally integral surface. The surface layer of gypsum slurry 38 may be modified to include additives, such as an engineered polymer, to provide structural strength and load carrying capability to the gypsum board product. As will be described, the optional polymer additive may also present a polymer matrix that provides a water impervious surface having desirable performance characteristics, such as, plastic sheathing, or water repelling, properties so as to expand the possible uses of the gypsum board products to both indoor and outdoor use.

In a preferred embodiment of the invention, the material comprising the bottom-facing sheet 14 is a mat of randomly aligned mineral, e.g., glass, fibers, having an average fiber diameter of 13-16 μm (0.005-0.0065 inches), and including a binder to hold the glass fibers in the form of a glass fiber mat having a desirable thickness. Such glass fiber mats are known for use in the production of gypsum board, for example, see aforementioned U.S. Pat. No. 6,524,679, U.S. Pat. No. 4,378,405 and WIPO Publication No. WO9809033 (European Patent No. EP 0 922 146). Use of a mineral fiber mat, which is porous to water generally, provides added structural strength to the gypsum board. The porous nature of the mineral fiber mat also permits gypsum slurry to penetrate through the pores between the mineral fibers and to permeate so as to cover both the top surface and through slurry penetrating the bottom surface of bottom facing sheet 14 because of slurry penetration. Thus, as the bottom facing sheet 14 passes through the roll coaters 40, 42, the unset higher density gypsum 38 is coated over the mineral fibers and is forced in the roll coating process to penetrate through the bottom facing sheet 14 and coat each of its top and bottom surfaces with an unset denser gypsum layer 38. Ideally, the high-density gypsum 38 is forced to penetrate 100% through the glass mat sheet 14, although manufacturing tolerances may permit penetration of approximately 95-98%.

In a preferred form, the roll coaters 40, 42 cause penetration of the unset denser gypsum slurry 38 to coat the bottom surface of the glass mat bottom sheet 14. This bottom surface of the bottom-facing sheet 14 will ultimately become the facing surface of the completed gypsum board products. Preferably, the unset gypsum slurry 38 is caused to form a dam 39, which then impregnates a continuous layer of unset gypsum through to the bottom surface of the glass mat 14 to form a dense slurry gypsum layer having a thickness that is in a range from approximately 0.01 to 2.0 mm, as measured from the outermost surface of glass mat 14. Although penetration of the slurry 38 may not result in a continuous layer having a discrete thickness, nevertheless the process preferably will result in each of the glass fibers, comprising the glass fiber mat 14, in being coated on its surface so that very few or no exposed uncoated glass fibers remain.

The speed of rotation of the rollers 40,42 may be adjustable depending on the viscosity of the density of gypsum slurry 38, the speed of linear travel of the glass fiber mat 14 and the amount of the gypsum slurry 38 to be applied to the mat 14. In effect, the roll coaters 40, 42 serve to deliver the slurry 38 through the small random openings between fibers of mat 14 and deposit the material on the top of the fabric web in greater or lesser amounts, as desired, filling the openings and coating both the bottom face as well as the top face of mat 14.

Although the roll coaters 40, 42 are shown rotating in the direction of travel of the bottom facing sheet 14, it is possible, and in some embodiments of this invention, desirable to have the roll coaters rotate in the opposite direction from that shown in FIG. 1. In such case, a mechanism such as a forming belt line, disposed downstream of the roll coaters 40, 42, described below, is utilized to provide a motive force for pulling the bottom facing sheet 14 through the gypsum board forming station 10, even against the reactive forces produced by counter-rotating coater rolls. Of course, alternatively, other means may be utilized at different locations in the processing production line to provide the motive force for moving the sheet 14 through the station 10, for example, another set of rollers downstream (not shown) that pull the mat 14 toward the right. It should be noted that the gypsum slurry layer on the top surface of bottom facing sheet need not be absolutely level or completely even since subsequent steps in the process may provide additional smoothing opportunities, as will be described below.

Gypsum board with mineral fiber facing sheets may be produced in multiple layers, including, but not limited to, a strong, more dense upper and lower surface layers and a less strong and less dense middle layer or core. The layered structure is advantageous as it allows the gypsum board to have a reduced weight, without sacrificing the composite structural strength of the final gypsum board product. Thus, and in accordance with the teachings of aforementioned U.S. Pat. No. 5,908,521, the continuous mixer 30 is configured to provide a second, less dense gypsum slurry, referred to as core gypsum slurry 44 or simply slurry 44, which comprises the bulk of the material in the finished gypsum board products. The core gypsum slurry 44 is pumped out of the mixer 30 by a control device 46 and through an outlet 48, which may comprising a rubber boot or hose. A continuous layer of the unset slurry 44 is caused to form onto the laterally moving combination bottom facing sheet 14 and layer of dense slurry 38.

The core slurry 44 may comprise a different composition of constituent material than the dense gypsum slurry 38, for example by the addition of filler or strengthening additives, as is known, or may simply comprise the same constituent elements but may have a lighter or less dense consistency because the gypsum slurry 44 contains foaming materials therein, which are not added to the dense slurry 38. It is known that a longer mixing time for the unset gypsum causes more of the entrained air bubbles, sometimes referred to as foaming, to reach the surface of the unset gypsum and thus to be removed from the unset gypsum slurry material. It is the greater amount of air, entrained as miniscule air bubbles, which gives rise to the lighter, less dense core gypsum slurry 44.

Gypsum slurry, and especially gypsum slurry that has been modified with polymer additives, has adhesive characteristics in its wet state that present some difficulty in handling. Accordingly, a film coating 43 is preferably provided on at least one of the roll coaters, preferably roll coater 42, which allows for easier continuous separation of the coater wheel surface from the surface of the wet gypsum surface while simultaneously depositing the majority of the gypsum slurry 38 on the mat of sheet 14. Materials for such a film coating surface include appropriate polymers, such as a Teflon® coating, that are capable of providing a firm surface yet avoiding gypsum slurry adhering or clinging to the surface of the roll coater wheels.

Another important reason for providing a denser slurry layer, in conjunction with a lighter core slurry layer in the gypsum board, is that the boundary between the dense slurry layers 38, and the core slurry layer 44 provides an inhibiting barrier that serves to control and inhibit the migration of the polymer additives from the surface dense slurry layer 38 to the core slurry layer 44. This migration is most likely to occur during the conventional heat rendering process, described below, used for drying the finished board product. The resulting board product is rendered better equipped to retain the polymer additives in the surface dense slurry layer 38, which thus form a better, more uniform polymer matrix base or "root system" for co-polymer formation with finishing products, as is described below.

As the dense gypsum layer 38 dries and cures, the polymer additives entrained therein migrate toward and through the underlying fiber facing sheet 14 and the migration may extend into the core slurry layer 44 in the form of tendrils or roots that provide for a greater integrity in the bond formed between the core gypsum layer 44, the fiber sheet 14 and the overlying dense slurry layer 38. Moreover, because the lighter gypsum layer 44 includes an entrained foam, and the dense slurry layer 38 does not, the penetration of the additive materials is deeper into the layer 44. This bonding produced by the impregnated additive polymeric material improves matrix formation, ultimately improving the surface hardness and structural integrity of the finished gypsum board, and provides a strong outer shell to the board and also improves the load bearing capacity, contributing to its flexibility.

Referring again to FIG. 1, after passing through the roll coaters 40, 42, the bottom facing sheet 14 passes onto a second forming table 50 having a horizontal forming surface 52. Although the first forming table 16 and second forming table 50 are shown as separate tables in the diagrammatic rendition of FIG. 1, it is possible and in certain cases preferable, that the forming table comprises one elongated table (not shown) with several cutout portions within which, for example, the creaser wheel assembly 20, or the roll coaters 40, 42 and vibrators, are mounted.

Figure 2:
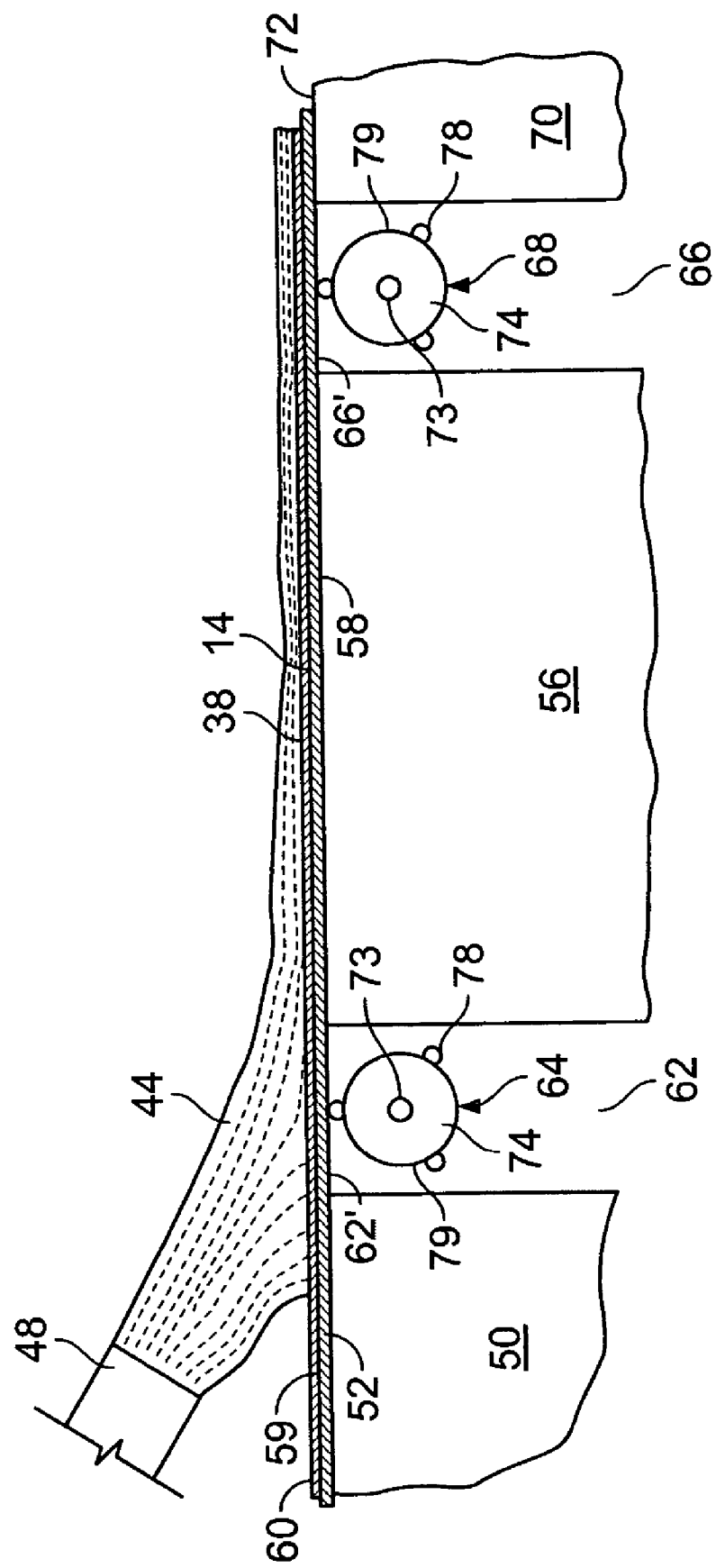
FIG. 2 is a detailed, cross-sectional, diagrammatical view of the vibrator sub-assembly shown in FIG. 1.

To facilitate the transport of the bottom-facing sheet 14, including the weight of the dense slurry 38 and core slurry 44, a non-stick table deck 59 is disposed over the surface 52 of table 50. Referring now to FIG. 2, which is a detailed view of FIG. 1, an upwardly facing surface 60 of table deck 59 provides a working surface for the production of gypsum board. Preferably, the table cover comprises a smooth, non-stick material, such as stainless steel, an elastomeric material, e.g., rubber, or a polymeric material, e.g., Formica®, and is of sufficient structural strength to support the moving weight of the slurry 44 deposited on the table 50.

As is evident in the detailed cross-sectional view of FIG. 2, the table deck 59 rests directly on surface 52 of table 50, so that as the core slurry 44 is deposited on the bottom facing sheet 14, the weight of the slurry 44 places downward pressure on the sheet 14, resulting in flattening of the under surface of the sheet 14 against the surface of the table deck 59. However, because of the smooth, non-stick characteristics of the table deck 59, the bottom facing sheet 14 and slurry 38, 44, freely traverse over the forming tables, as described below.

The cross-sectional view of FIG. 1 also does not show the width of the outlet spouts 34 and 48. Various known configurations may be utilized, including an elongated spout that is disposed transversely to the direction of board travel. Such spouts may output a sheet of gypsum slurry across the width of the mat 14. Alternatively, a tubular spout attached to a rubber boot (as shown) deposits a continuous stream of gypsum slurry onto the glass fiber sheet 14. That gypsum slurry stream may then be spread out, before reaching the roll coaters 40, 42, to provide a smooth surface over the sheet 14 by, for example, diagonally angled vanes (not shown) or by specially constructed rollers or a dam that spread the gypsum slurry from the center toward the edges of bottom sheet 14. The exact shape of the spouts is not considered to be critical to this invention, as long as the function is achieved of evenly spreading the gypsum slurry over the entire width of the mat of both the bottom and top sheets.

The unset, less dense core gypsum slurry 44 is deposited on the penetrated bottom facing sheet 14 at or adjacent a third forming table 56, having a top surface 58, for supporting the combination of penetrated mat 14 and slurry 44. An opening 62 between the second forming table 50 and third forming table 56 provides a space for disposing a first deck vibrator 64, and another opening 66 provides for mounting a second deck vibrator 68 between the third forming table 56 and a fourth forming table 70, having a top surface 72. Such vibrators are described in U.S. Pat. No. 4,477,300, which is incorporated by reference herein.

As shown more clearly in the detailed view of FIG. 2, the table deck 59 extends between the first and second forming tables 50, 56 over the opening 62, and also between the third and fourth forming tables 56, 70 over the opening 66. Because each of the tables 50, 58, 70 are disposed so that their surfaces 52, 58, 72 are coplanar, the table deck 59 mounted onto the table is vertically fully supported across essentially the full length of the gypsum board forming station 10, i.e., across the full length defined by second to fourth forming tables 50, 56, 70.

Shown in FIG. 2, deck vibrators 64,68 each comprise rolls 74, which are mounted immediately adjacent sections of the table deck 59 covering the upper portion of the respective openings 62, 66. Each of the deck vibrator rolls 74 are mounted to rotate around axles 76, both extending horizontally in a direction transversely to the direction of travel of the board production line. Each of the rolls 74 has a diameter that is just slightly less than the radial distance between each axis 76 and the bottom surface 62', 66' of the table deck 59 covering the respective openings 62, 66.

Each deck vibrator 64,68 further comprises a plurality of bumps 78 which extend radially beyond the outer surface 79 of the deck vibrator rolls 74. Bumps 78 extend longitudinally along the surface 79 of the rolls 74 in a direction parallel to the axis 76. As the deck vibrator rolls 74 rotate about axis 76, the bumps 78 routinely strike the underside surfaces 62', 66' of the table deck 59, which momentarily lifts the table deck 59, together therewith the bottom facing sheet 14 and slurry 38, 44, combination, which agitates the slurry resting on sheet 14. Such agitation causes the slurry 38 to even out over the upper surface of the penetrated mat 14 and also causes the slurry 44 to more completely permeate through and bond with the denser slurry 38 located on the upper surface of the bottom facing sheet 14.

Another feature provided by the deck vibrators 64,68, is the "kneading out" of larger entrapped foam air bubbles from the bottom surface of the bottom facing sheet 14. As the bottom-facing sheet 14 passes over the openings 62, 66, the denser slurry 38, which has penetrated through the mat of bottom facing sheet 14, is still unset and continues to have entrained air bubbles within the gypsum slurry and adjacent bottom sheet surface. Vibration from the deck vibrators 64, 68, causes these foam bubbles to reach the surface and exit from within the penetrated gypsum slurry 38, thus resulting in a smooth outer surface of the completed gypsum board when the manufacturing process is completed, as in aforementioned U.S. Pat. No. 4,477,300.

Completion of the smoothing operation of the slurry 44, resulting in an essentially planar combined bottom facing sheet 14 and core slurry 44 is further facilitated by a forming plate in the top and bottom sheet joining station 80 (FIG. 1), disposed downstream, i.e., toward the right as seen in FIG. 1, of the deck vibrators 64, 68. The forming plate assembly of sheet joining station 80 operates in conjunction with a top facing sheet 114 formed by the sheet coating station sub-assembly 110 having similar elements to those in the main production line that form the bottom-facing sheet 14.

Top-facing sheet 114 is comprised of a sheet or mat of randomly aligned mineral fibers, such as glass fibers, and is unrolled from a supply roll 112, similar to the supply roll 12. Similar elements to those used for the production of bottom facing sheet 14 are identified by like numerals in the 100 series, utilizing the same two last digits as those identifying the like elements in the production of the bottom sheet 14. Supply roll 112 pays out a continuous top facing sheet 114, which, in the completed gypsum board, will be adjacent the inner facing surface of the gypsum board product subsequently used in wall construction.

As shown in FIG. 1, the top facing sheet 114 may require feeding through various loops around, for example, rollers 102, so as to avoid interference of the main production line by the operation of top sheet sub-assembly 110. Top sheet sub-assembly 110 directs the top facing sheet 114 over a top sheet forming table 116 having an upwardly facing surface 118.

Figure 3:
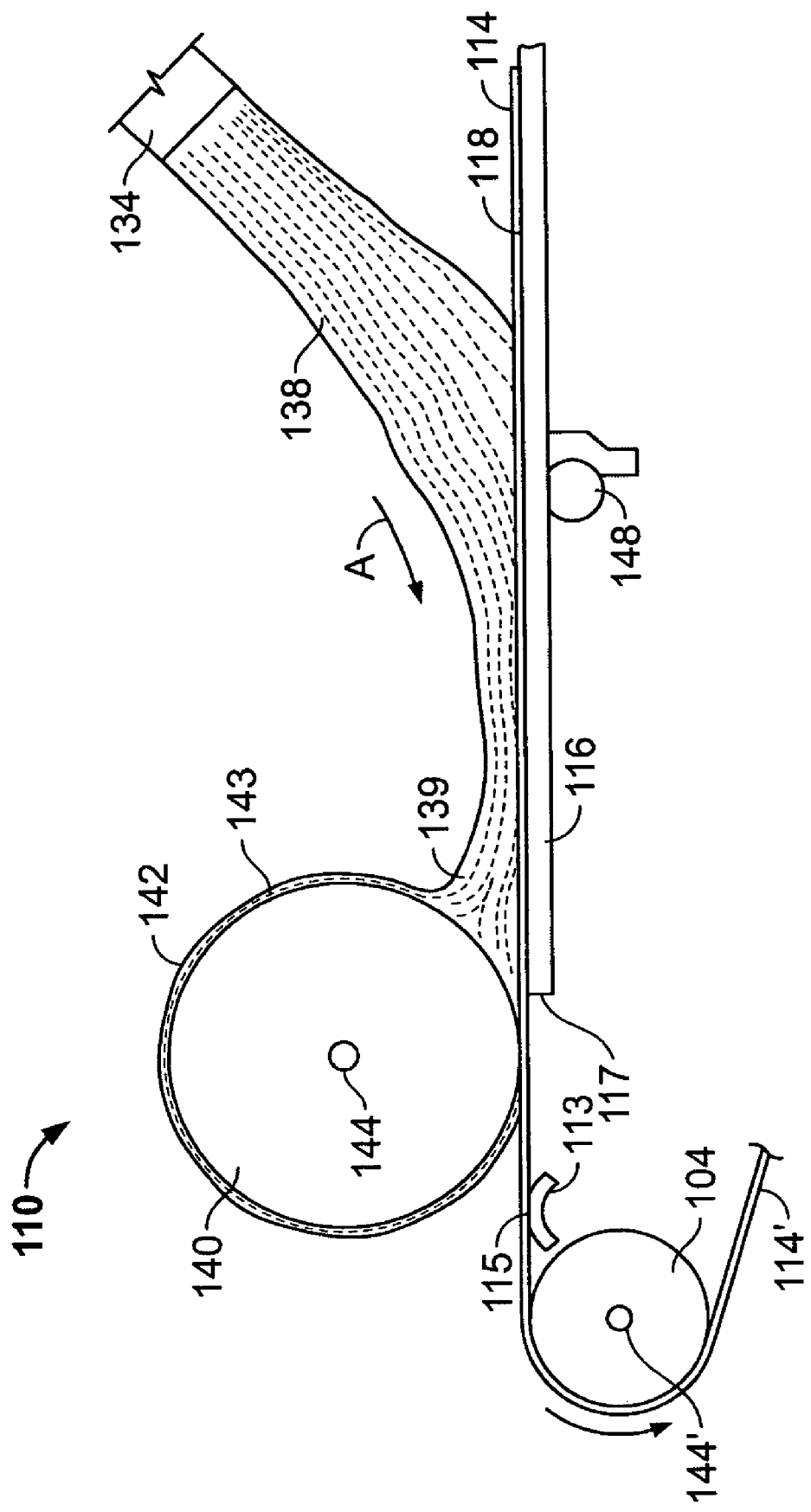
FIG. 3 is a detailed, cross-sectional, diagrammatical view of FIG. 1, showing the top sheet sub-assembly according to the present invention.

The continuous mixer 30 further comprises a slurry outlet 134 being controllable by a control device 136 providing a continuous stream of denser gypsum slurry 138 to the sub-assembly 110 for deposit onto the top facing sheet 114, as shown. A detailed cross-sectional view of the top sheet production station portion of sub-assembly 110 is illustrated in FIG. 3, and reference is now jointly made to FIGS. 1 and 3. Although in FIG. 1, the preferred embodiment of two separate slurry controllers 36, 136 are shown for supplying two different slurry mixtures 38, 138, for respectively, the bottom facing sheet 14 and the top sheet 114, it may be desirable to have one mixer discharge leading to dual controllers for controlling the discharge of two or more outlets, similar to that described in aforementioned U.S. Pat. No. 5,714,032. Alternatively, a single controller (not shown) may be used with the discharge outlets having individual valves enabling variable flow of gypsum slurry that is controllable for each outlet spout depending on the operational needs of the board production process.

Shown in FIG. 1, are separate controllers 36, 46, 136, each for controlling the output of a single outlet, i.e., dense gypsum slurry outlets 34, 134, or core slurry outlet 48. The configuration of the continuous mixer 30 provides separate mixing chambers, each attached to, and feeding gypsum slurry to, a separate outlet, which provides a specific type of gypsum slurry, as needed. Customization of the slurry provided to each of the outlets 34, 48, 134 thus enable a gypsum board line operator to provide different slurries, having desirable characteristics, to the location in the manufacturing line where needed. For example, an outlet, such as outlet 34, may be required to provide a denser gypsum slurry, such as slurry 38. The slurry may be desired to include specified additives, for example, a polymeric compound, which forms a matrix with the set gypsum after it sets, so as to provide a suitable surface for further finishing, as will be described below. However, if it is only necessary for the front facing surface to have such a surface, then using the embodiment shown in FIG. 1 provides the option to include the additive in only the dense gypsum slurry 38, pumped from controller 36, but not to include such an additive in the slurry 138, which will end up on the inner, back side of the gypsum board during construction. Alternatively, the gypsum slurry 138 is denser than the core slurry 44, and may have an identical consistency as that of the slurry 38 coating the bottom facing sheet 14.

Referring again to FIGS. 1 and 3 showing the top sheet slurry coating station 110, the dense gypsum 138 is deposited on the top facing sheet 114, comprised of a mat of glass fibers, which is moving in the direction shown by arrow A, past the surface of the top sheet slurry table 116. The top sheet is moving essentially at the same rate as that of the bottom facing sheet 14 traveling over forming table 16. The gypsum slurry 138 is denser than the core slurry 44, and may have an identical consistency as that of the slurry 38 coating the bottom-facing sheet 14.

The top facing sheet slurry coating station 110 comprises a short forming plate 116, similar to the forming table 16, with the exception that the linear dimension of plate 116 is much shorter, having a sufficient length to achieve deposition of the gypsum slurry 138 and to spread out the slurry over the surface of the moving top facing sheet 114 between the lateral edges of the continuous sheet 114. To assist in the process of spreading the gypsum slurry 138 over the surface of sheet 114, one or more pneumatic table vibrators, such as vibrator 148, may be included to vibrate the surface 118 of the table 116.

Applicator wheel 140, having a cylindrical surface 142, rotates about an axle 144, which axle 144 extends transversely to the direction of travel of the sheet 114. The vertical and horizontal disposition of axle 144 is important in obtaining the desired result of sheet 114 being fully impregnated with the dense slurry 138. As shown in FIG. 3, axle 144 is disposed linearly at a very short distance past the edge 117 of table 116. The axle is vertically disposed just slightly less than the radius of wheel 140 above the table surface 118 so that the applicator wheel 140 extends into the space under the plane defined by the table surface 118. As is shown in FIG. 3, during production the applicator wheel 140 puts downward pressure on top facing sheet 114, which sheet is deflected some slight distance from its linear path followed across the table surface 118.

The dense gypsum slurry 138 being deposited on the moving top facing sheet 114' produces a slurry concentration at a dam 139, comprised of excess dense slurry 138, which collects in the constricted space between the applicator wheel 140 and the top facing sheet 114. The size of dam 139 can vary, depending on the desired characteristics of the resulting impregnated top facing sheet 114' that is produced by the top sheet coating station 110. For example, if a greater degree of coating is desired to provide greater structural strength of the gypsum board, then the size of the dam 139 may be adjusted so that a greater amount of dense gypsum slurry is impregnated into the interstices between the mineral fibers of the mat comprising top facing sheet 114. For purposes of distinction, top facing sheet 114 is designated as impregnated top facing sheet 114' after impregnation by the dense slurry 138.

Working in conjunction with the applicator wheel 140 is downwardly curved transversely extending directional plate 113, upon which the sheet 114 impinges as it exits from contact with the applicator wheel 140. The directional plate 113 is preferably mounted so that the apex 115 is adjacent or within the plane defined by the surface 118. This positioning causes the sheet 114 to be placed into tension as the applicator wheel 140 pushes the sheet 114 downwardly from the plane, which disposition assists in the penetration of the gypsum slurry 138 through the mat of sheet 114. To inhibit the formation of slurry 138 on the surface 142 of applicator wheel 140, an appropriate thin film coating 143, comprising, for example, a Teflon® coating, may be optionally disposed on the surface of wheel 140, similar to the coating 43 of roll coater 42 described above.

The top sheet 114', impregnated with the dense gypsum slurry 138, is directed from the applicator wheel 140 to a second roller wheel, the transition roller wheel 104, having an axle 144' that is parallel to axle 144. The transition roller wheel 104 is in the general path and in the plane defined by the surface 118, and its function is to change the direction of travel of the top facing sheet 114' so as to render the top surface of the sheet to become the bottom surface, and vice versa. That is, the surface of the top facing sheet 114 that was on the bottom adjacent the surface 118, becomes the top surface and the sheet 114' is ready for delivery to and joining over the core slurry 44, as is described below.

The sheets 14, 114' are joined at a sheet joining station 80 (FIG. 1) that is described in more detail in aforementioned U.S. Pat. No. 6,524,679, and the remainder of the discussion in that patent relating to the board forming structure and methods will be omitted for brevity, except for the following paragraphs describing the ratio of the polymer additives to the gypsum.

It has been found and it is a feature of this invention that addition of a specific group of polymer additives, when mixed into the dense slurry 38, provides a number of these characteristics that provide the defined advantages. The solid polymeric compounds are dissolved in water in almost any desirable proportion, but preferable is a solution of about a 45% polymeric solids content diluted in water. In a preferred embodiment, the polymeric solution is pumped to the predetermined controller(s), for example controllers 36, 136, and added to the mixture of dense slurry 38, 138 mixed in each chamber of mixer 30. The dense slurry controllers 36, 136 then supply the dense slurry 38, 138 though outlets 34, 134 directly to the applicator roll coater wheels 22, 22' as needed, to provide an increased physical surface strength to the completed gypsum board, so as to significantly exceed standard board specifications.

Ideally, the polymer additive in the gypsum slurry solution enhances the bonding strength also between the core slurry 44 and the outer surface dense slurries 38, 138 and between the dense slurry that extends across and through the mats of the glass fiber facing sheets 14 and 114'. The polymer is thought to generate a polymer matrix that extends from the junction of the lower density core slurry and into the dense slurry layers 38, 138, which have penetrated through the sheets 14, 114, and to extend to the surface of the gypsum board. The polymer matrix is effectively embedded within the gypsum base and provides a coalescing surface upon which further finishing can be based, for example, painting or a water impervious acrylic cover, that may be added at this stage of the finishing process, for example, by spray coating.

The surface texture of the front face of the completed gypsum board includes the polymer, which as a part of the underlying matrix, presents a smooth dense layer of gypsum to which other polymeric, e.g., acrylic, compounds can adhere. As the polymer layer cures, for example, in the drying process, it hardens to provide a stiff surface capable of retaining a load. The surface having the polymer additive, reduces chalking, improves water resistance and provides specific sites for chemical adhesion by other polymers. The composition of a water resistant or impervious coating can comprise one or a combination of the following polymeric compounds: polyacrylamide, polymethylacrylamide, polyvinyidene chloride (PVDC), Nylon.RTM., polyvinylchloride (PVC), polyethylene, cellulose acetate, polyisobutylene (Butyl Rubber), polycarbonate, polypropylene, polystyrene, styrene, butadiene, styrene butadiene copolymer, polychloroprene (Neoprene®), tetrafluoroethylene fluorocarbon and fluorinated ethylene propylene (Teflon®), natural rubber, poly (2,6 dimethyl pentene oxide), poly 4, methyl pentene-1 and polydimethyl siloxane.

Preferably, the polymer is in solution with the water and can be in a range of from about 1% to about 99% solution, but a preferable range is from about 40% to 50% polymer, and most preferably is about 45% polymer by weight. Preferably, the polymer solution is pumped into the controllers for delivering gypsum slurry to the front and back face sheets 14, 114' at a supply rate between about 190 cm$^3$ (0.05 gallons) per minute to about 0.019 m$^3$ (5.0 gallons) per minute and a preferred rate of between 190 cm$^3$ (0.1 gallons) to 0.004 m$^3$ (1.0 gallons) per minute. The actual delivery rate may vary depending on the speed of the board production line and other manufacturing considerations.

The surface coating is preferably applied to the front board face directly onto the smooth or textured surface at a rate that results in a thickness in the final gypsum board product, also referred to as the dry coverage thickness, in a range from about 0.5 mils. to about 4.0 mils. The application rate measured by weight of the wet acrylic solution per unit area of the board surface covered can be in a range of from 0.0054 grams/cm$^2$ (0.18 oz. per square foot (oz./sf)) to about 0.045 grams/cm$^2$ (1.45 ozs./sf). Ideally, the acrylic coating may comprise at least in a portion thereof one or more rheology modifying compounds that assist the coating in striking into the front face slurry surface layer.

The features that are significant to the present invention relate to the mixer 30 and the dispersion of the additives onto one or both of the mats 14, 114 before they are assembled at the gypsum board forming station. As shown in FIG. 1, and described in the parent U.S. Pat. No. 6,524,679, the dense slurry layers 38, 138 which are deposited onto the mats 14, 114 before they are joined with the core slurry layers 44, are first deposited on one or more specified locations on the mats 14, 114 and then are dispersed across the width of the mats 14, 114 by the rollers to provide a uniformly thick film of dense slurry before they are joined at the sheet joining station 80. This even layer of dense gypsum is for the most part evenly distributed and for most additives, the distribution of the additives within the dense slurry 38, 138 is also evenly distributed across the mats 14 or 114 by virtue of the dispersion of the additive within the dense slurry layer when it is mixed into the dense slurry at controllers 36 or 136. However, for certain types of additives, for example, hydrophobic additives, it has been found that the mixture into the dense slurry is not always even, but may result in clumps or uneven dispersion of the hydrophobic additives throughout the dense slurry layer. As a result, when the dense slurry is dispersed over the mats 14, 144, the film of dense slurry may be evenly and consistently spread out over the surface of the mat, but the additive itself may be clustered, either randomly or periodically, on the mat. Such as eventuality is undesirable, since uneven dispersion of the additive on the surface of the gypsum board products often result in the additive working poorly or inadequately to perform the function for which it was added.

For example, one additive that was found to experience inconsistent dispersion over the board surface was a wax emulsion. The wax emulsion was added to provide desirable characteristics to the board surface, for example, to enhance water resistance at the board surface. However, as is generally well known, water will seek to penetrate into a surface and will first succeed to do so at a point of least resistance. Thus, water seepage into the core of a board was facilitated by the uneven dispersion of the wax emulsion, and the boards were found to not meet the exacting standards of water resistance that were required in certain jurisdictions. Thus, the features of the present invention were developed to provide for more even dispersion of additives, and especially hydrophobic additives, into the dense gypsum slurry and thus to provide a consistently more even dispersion of the additive over the complete width profile of the board.

Figure 4:
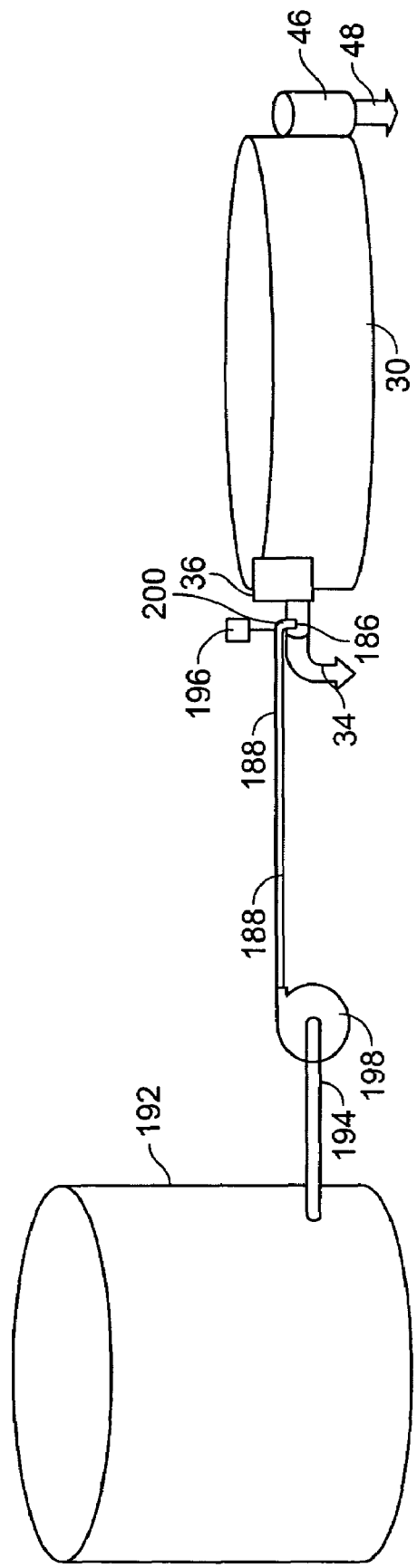
FIG. 4 is a schematic illustration of the structural elements used to provide the emulsion mixing and delivery system to the desired layers of the gypsum board.

Referring now to FIG. 4, in which similar elements are identified by the identical reference numbers, the mixer 30 is shown in a schematic diagram illustrating the additive delivery system. Mixer 30 may take the form of any of a number of mixer types, but in this instance, the mixer 30 preferably is a pin mixer 30 known in the art. The pin mixer 30 is the general mixer for all slurry for both the dense slurry layer and the core slurry layers. As described above, the core slurry 44 is taken directly from the mixer 30 through the controller 46. However, the controller 36 controls the dense slurry 38 as it is siphoned from the pin mixer 30. The pin mixer 30 has an inlet aperture 186 connected to an additive feed pipe 188 that feeds directly into the dense slurry outlet 34. The pipe 188 is used for delivery of dense slurry 38 to one or both of mats 14, 114 onto which dense slurry 38 or 138, having the appropriate additives, is desired. Thus, the additive feed pipe 188 is capable of introducing an additive directly into the slurry stream as it passes through the dense slurry outlet 34.

Although shown being connected to only the one dense slurry outlet 34, it should be understood that another pipe, similar to pipe 188, may also be attached to other outlets, either of the dense gypsum slurry, for example, outlet 134, or even to the core gypsum slurry outlet 148, if that is found desirable. The described structure is not to be limited to the single connection shown, but a feature of the invention is the capability of targeting specified additives to that gypsum layer where they are desired. Other modifications will also become apparent to a person having ordinary skill, for example, connecting the additive feed pipe 188 directly to the controller 36 or 136, where the desired additives are mixed into the dense gypsum slurry stream as other controls and processes are simultaneously occurring.

Referring again to FIG. 4, the additive provided for mixing into the gypsum slurry streams is contained in an additive reservoir 192. Because the construction described herein is especially well suited for even dispersion of wax additive, for providing the desirable water absorption resistance at the surface of the gypsum board. The reservoir 192 contains wax, and it may require a preheating arrangement and a method of emulsifying the wax into an emulsion that can be easily dispersed in an aqueous slurry. The reservoir 192 schematically is shown being separated from the injection port 186, but it may be patentable to provide the reservoir closer to the pin mixer 30, of physically possible, to maintain the wax in the emulsified condition prior to delivery.

A transfer pipe 194 is connected at one end to the wax emulsion reservoir 192, which provides a continuous stream of wax emulsion to the injection port 186, as needed. Filtration of the wax emulsion may be required, and a filter (not shown) may be disposed in the transfer pipe 192 to avoid excessively large wax solids from entering the wax emulsion stream to avoid plugging or clogging the delivery system, as will be described below.

The transfer pipe 192 is connected at the other end to a pump 198 that may include a flow control for regulating the rotation of the pump 198, or as a separate flow control valve 196 disposed in-line in either the transfer pipe 194 or the additive feed pipe 188, so as to control the rate of flow of the wax emulsion additive to the injection port 186. The wax emulsion rate flow control is a significant feature of the present invention, as very low flow rates are required for the additive, so as to maintain the desirable homogeneous consistency and constituent ratio of the dense gypsum slurry to additive. This permits the invention to achieve the optimum balance between reducing the cost of unnecessary additive, while also simultaneously providing a homogeneously applied water resistance, that is, consistently reducing the surface absorption characteristics, across the compete lateral surface of the board.

To achieve the desired purposes, another significant feature is provided at the injection port 186, that mixes the additive into the dense gypsum slurry as it is transferred from the pin mixer 30 to the top and bottom slurry coating stations 110, 18, respectively. Thus, there is provided an additive delivery system 200, disposed in-line at the additive injection port 186 within the end of the additive feed pipe 188 that is attached to and feeds the dense slurry outlet 34. An added impetus beyond gravitational forces for transferring the additive from the reservoir 192 to the additive delivery system 200 is shown schematically in FIG. 4, and comprises a pump 198, that may be a positive displacement pump, an air diaphragm pump, or other appropriate pumping mechanism. Other appropriate pumps comprise a MOYNO pump, available from Moyno, Inc., of Springfield, Ohio or a TRIPLEX pump, available from Kerr Pumps, of Sulphur, Okla. The positive displacement is necessary to maintain a positive pressure on the additive stream to make it available at the additive delivery system 200, when and as needed. These types of positive displacement pumps are preferable because they avoid shearing of the emulsion, and so maintain the emulsion in the desired state.

Figure 5:
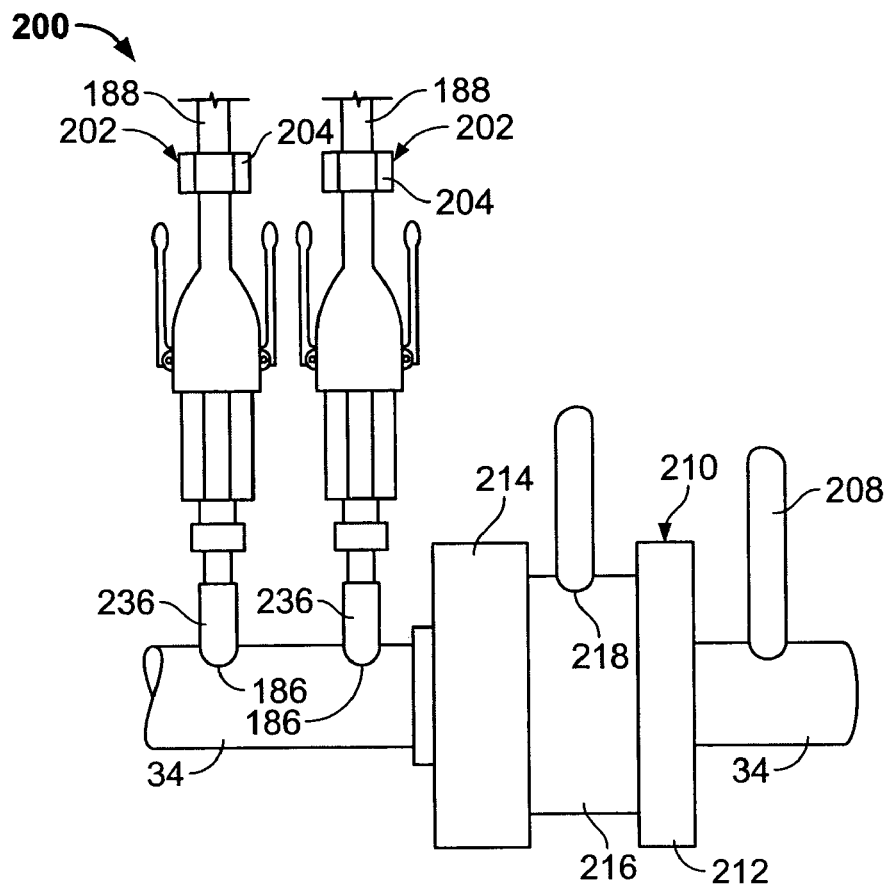
FIG. 5 is a detailed plan view of an embodiment of the invention.

Referring now to FIG. 5, two additive delivery systems 200 are each connected to an additive feed pipe 34 at separate additive injection ports 186. Although two additive delivery systems 200 are shown, any number from one to twenty such systems may be utilized, depending on the amount and types of additives that is desired to be added to the slurry stream in pipe 34. Each of the systems 200 includes a quick connect coupling 202 to enable the quick connection to an input additive feed pipe, such as pipe 188 shown in FIG. 4. The quick connect coupling 202 is prefabricated and is attached to the system 200 and may include a quick connect hut 204 that provides a sealed fluid communication to the pipe 188 upon a simple tightening of nut 204.

This arrangement provides for several advantages, including that of selective and easy attachment of the appropriate additive delivery system 200 to the dense gypsum slurry stream, depending on the type and characteristics of the board desired for manufacture. Alternatively, and in view of the below described construction of the system 200, it may be appropriate to connect two or more systems 200 to the same feed pipe (not shown), thereby delivering twice the amount of slowly injected additive into the slurry stream. This alternative procedure may be utilized to avoid excessive flow rate that would flow through a single system 200, and would also ensure more complete mixing of the additive in the gypsum slurry.

As shown in FIGS. 1, 4 and 5 first gypsum slurry outlet pipe 34, connected to the pin mixer 30, and extends in an outward direction therefrom. After being discharged from the controller 36, it is connected to a first input pipe 208 that may be utilized as an extractor for dense slurry from the slurry stream, in the event such slurry is desired, for example, for testing or quality control, or if necessary for some other process in the manufacture of the gypsum board panels.

Downstream along pipe 34 a diaphragm pinch valve assembly 210, comprising a connecting joint 212 connecting to the pipe 34 at one end, a diaphragm pinch valve 214 at the other end, and a central section 216, to which an air supply port 218 for the diaphragm pinch valve 214 is connected. The diaphragm valve 214 is pneumatically driven by the air supply and can control flow rate of the dense gypsum slurry as it passes through pipe 34.

Immediately downstream of the diaphragm pinch valve assembly 210 there are disposed the two additive delivery systems 200, but fewer or more of these systems 200 may be connected to the pipe 34. Although, the preferable configuration of downwardly flowing systems 200 are shown, in order to be assisted by gravity flow of the additive, it is contemplated that this orientation may be changed to conserve space, and the systems may be disposed at an angle to the vertical or even underneath the pipe 34.

The wax emulsion additive providing in the reservoir 192 (FIG. 4) may be any of a variety of waxes capable of providing water resistance to the surface, for example, one or more of a paraffin wax emulsion or other known and commercially available materials capable of providing water resistance characteristics. Furthermore, although described above in terms of the use of these additives with a fiber mat faced gypsum board, the present invention may also be used together with standard paper faced gypsum to increase the water resistance characteristics at the gypsum paper surface interfaces of such boards, or other types of cementitious boards in which targeted delivery may enhance the value of the products. Other additives that can be utilized in this method for both the types of panels described in aforementioned U.S. Pat. No. 6,524,679 and for paper face products and any combination of cementitious and paper to improve or enhance other properties are as follows: polymers, boric acid, borates, other intumescence-like additives, surfactants, dispersants, retarders, potash, silicates, starches, phosphates, perlite, alumina and any material that can be solubilized or dispersed in a liquid media may be used.

Figure 7:
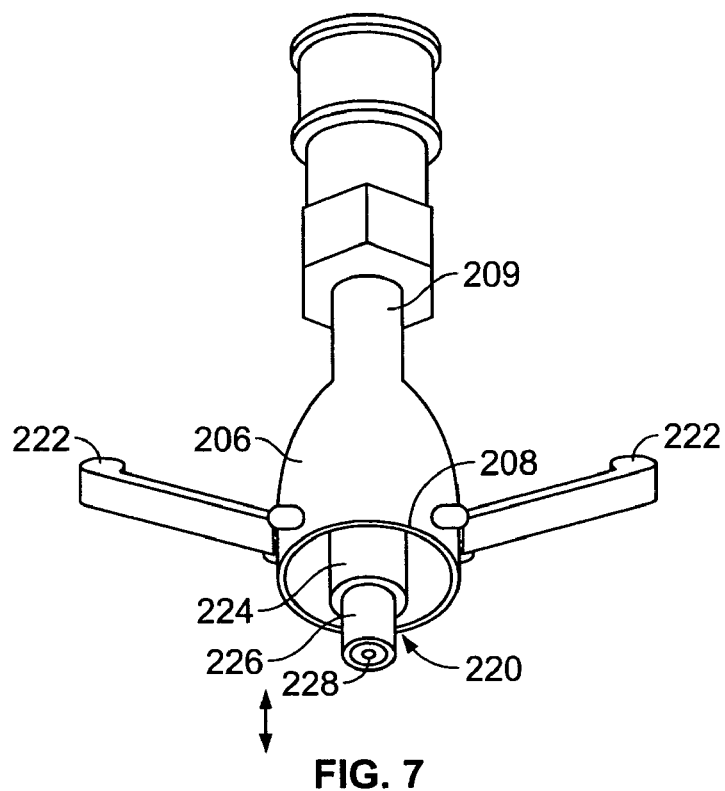
FIG. 7 is a perspective partially cutaway or unassembled view of the inventive system shown in FIGS. 5 and 6.
Figure 6:
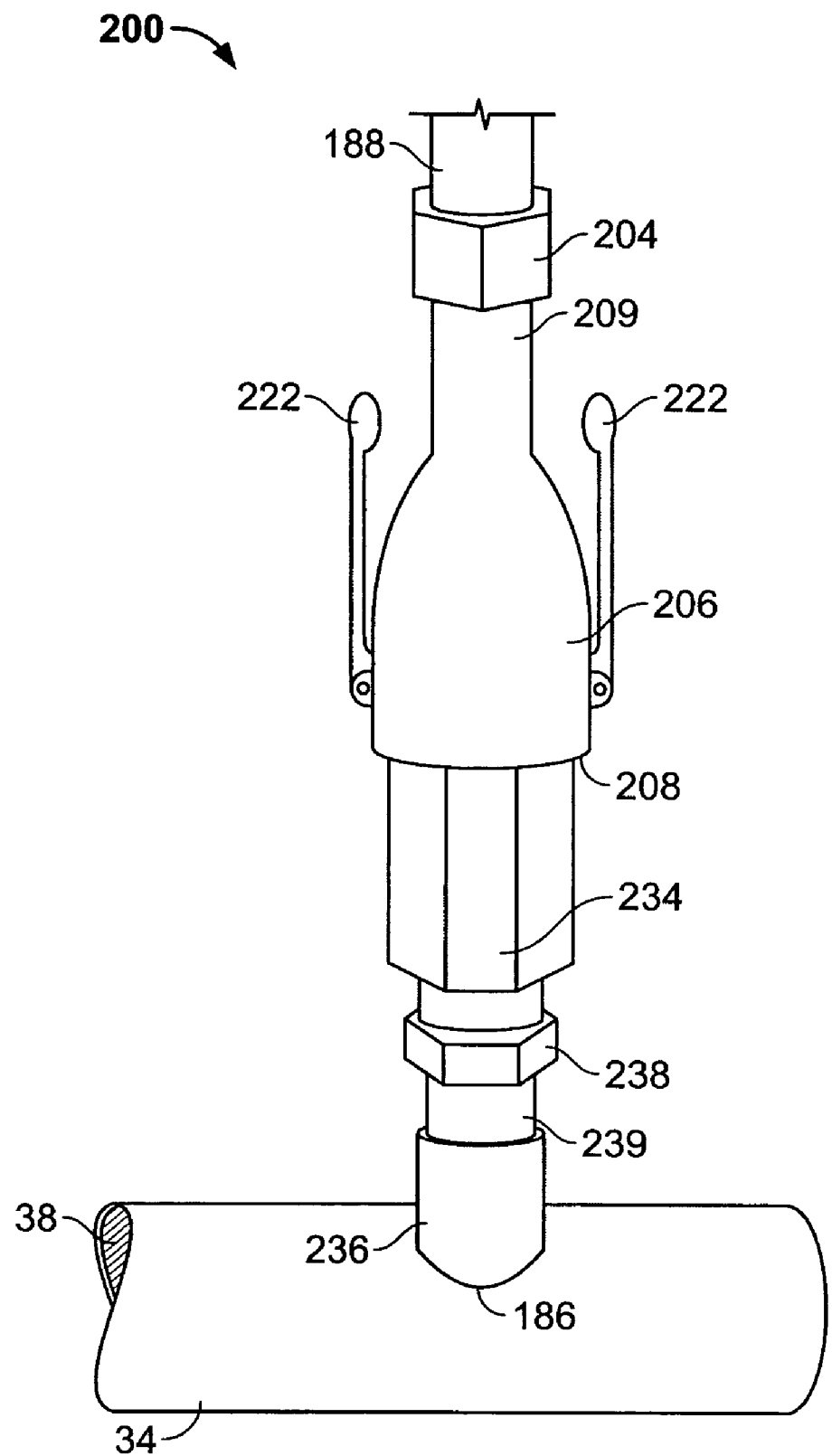
FIG. 6 is a detailed perspective view of a single one of the inventive additive delivery systems.

Referring now to FIGS. 6 and 7, perspective views, respectively, of a ready to deploy and of a deployed additive delivery system 200, shown in alternative embodiments. As shown in FIG. 6, system 200 includes the quick connect nut 204 for connecting additive feed pipe 188 to the additive inlet port 186. With this quick connect, a user may easily exchange pipes for providing other alternative additives, as desired, for injection into the dense slurry stream.

For example, a wax emulsion additive has been described above. However, other chemical additives may be desired to be added by targeting only one of the layers of gypsum. Also physical additives may also be added for providing other desirable characteristics, for example to the dense slurry layers. One such exemplary additive may comprise the targeting of microfiber to the stratified dense slurry layer for providing enhanced structural strength to the outer layers of the finished gypsum board product. Alternatively, the microfibers may be introduced to both the dense and core gypsum layers, but in different concentrations, e.g., more concentrated mixture of microfibers may be added to the dense slurry layer and a less dense concentration may be added to the core gypsum, utilizing the teachings and structural features of the present invention.

The microfibers may comprise any of a number of different materials, for example, e-glass, carbon, mineral fiber, polymeric and/or metallic fibers and the concentrations may be varied, depending on the specific characteristics of the gypsum layers that are desired. An appropriate range of concentration of such microfibers may be between 0.1% to 5.0% by volume. The microfibers may have lengths of from between 1.0 and 25.0 mm, widths of between 0.002 and 0.025 mm and an aspect ratio of between 1:1 and 25:1, depending on requirements.

Referring again to the system 200 shown in FIGS. 6 and 7, once the quick connect coupling nut 204 is tightened on to the system 200, there s a sealed flow of the additive materials, for example, a wax emulsion, through the system 200 and into gypsum slurry pipe 2\34. The system 200 thus includes structural features that control the consistency and dispersion of the additives within the slurry stream passing through pipe 34, as described above.

Additive delivery system 200 comprises an enclosing housing 206 that is shown as a rounded conical housing having a large diameter opening 208 and a small diameter opening 208 and a small diameter opening 209. The small diameter opening 209 is connected by the quick connect pipe 204 to the additive feed pipe 188, and provides fluid communication so that the additive may flow through the housing 206 toward the inlet port 186. Although shown as having conical shape, the housing 206 may take any type of shape commensurate with maintaining the flow of additive into the slurry stream 38 in pipe 34, for example, an oblong bow or an octagonal enclosure.

Housed within the enclosing housing 206 is a turbulator 220 that extends beyond the large diameter opening 208 in a longitudinal direction, as shown. The turbulator is fixed as shown in FIG. 6. It should be noted that FIGS. 6 and 7 drawing may not necessarily be to scale. The turbulator 220 is a feature of the invention that assists in homogeneous blending at the injection point of the additive into the slurry stream. The additive feed system 200 includes two insertion/retraction handles 222 that provide the controls for the longitudinal position of the turbulator 220, so that when in the undeployed position as shown in FIG. 7, the handles extend radially outwardly to disconnect the turbulator 220 from the receiving neck 234. Pulling the handles 222 toward the housing 206, as shown in FIG. 6, locks the turbulator 220 in a direction away from the smaller diameter opening 210, and when connected within the system 200, toward the additive injection port 186. Pulling said handles in locks the coupling into position, connecting the housing 206 to receiving neck 234. In this position, tubular constrictor valve 224, injector nozzle 226, and additive outlet opening 228 extend into receiving neck 234 and position the turbulator 220 for desired delivery of additives. The turbulator 220 comprises a tubular constrictor valve 224, which is attached to an injector nozzle 226, having an additive outlet opening 228 at the distal end thereof The inner diameter of the injector nozzle 226 may be in a range of from about 3/32 to about 3/16 of an inch (2.38 to 4.75 mm), and preferably is about 1/8 of an inch (3.17 mm) in diameter at the opening 228. The additive outlet opening preferably has an internal opening diameter that is much smaller than that of the injector nozzle, and may be in a range of from about 3/32 to about 1/16 of an inch (2.38 to 1.59 mm)

The above-described configuration provides egress of wax emulsion solids at an appropriate flow rate into the dense slurry layer of between 1 lbs./Msf to about 10 lbs./Msf where Msf is one thousand square feet. The turbulator delivery pattern, that is, the spray of additive that is delivered to the dense gypsum slurry 38 may comprise one or more known patterns that can provide the maximum dispersion of the additive material within the slurry stream, for example, a flat, conical multiple linear injection, or other appropriate geometrical pattern capable of injecting the additive materials deep into the slurry stream so as to effectively mix then thereinto. Thus, although shown having a cylindrical delivery tip in FIG. 7, the delivery tip and additive injection opening 228 may take other forms to provide a different delivery pattern and thereby to achieve optimal additive homogenization in the slurry stream.

The angle of injection also provides a variable additive injection parameter that can be optimized for obtaining maximum additive penetration and homogeneity of additive in the slurry stream.

That is, while the angle shown in FIG. 7 is directly perpendicular to the plane of the end opening 208 of the housing 206, other injection angles can be used as well, and may take on either an acute angle relative to the direction of slurry flow, and may be either angled with or against the flow in a range of from about 1° to about 179° relative to the direction of flow. Optimally, the angle is very close to perpendicular as shown, but practical adjustments in a range of from about 70° to about 110° possibly provide desired mixing effects of the additive materials as these are delivered into the slurry stream. For example, an angle which injects the additive into the stream at an angle against the flow of the fluid stream so that the mixing occurs more vigorously. However, this may not be desirable in some instances, for example, if it is not desirable to inject the additive material counter to the slurry stream so as to avoid excessive agitation or to avoid disturbing the slurry flow. In such a case, it may be preferred to angle the additive injection direction with the flow of the slurry stream and have the additive be mixed into the slurry by natural agitation during delivery and spending of the dense slurry 38 over the mats 14, 114 or alternatively, over paper facing.

The turbulator 220 has not been generally utilized for providing additive injection into the slurry of a gypsum board line during the manufacturing process of gypsum board. Thus, although such turbulator nozzles are available commercially, for example, from Spraying Systems, Co. of Wheaton, Ill. available as Part No. 1/8HH-SS8W, these types of turbulators have not been made nor used for dispersion of additives directly into a flowing slurry stream. The aforementioned U.S. Pat. No. 4,378,405 to Pilgrim, for example, teaches a surface modifying additive such as water-proofing agents, in the form of synthetic resins, to be sprayed onto the glass mat fabric or web, but this suggestion does not necessarily result in the desired additive on the surface of the gypsum board product, especially if the mat is essentially encased in the gypsum, as is taught in the aforementioned parent U.S. Pat. No. 6,524,679. Others teach the dispersion of the additive in the core gypsum slurry as well as the surface layers in equal propositions, thus failing to provide the targeted additive delivery to specific layers.

As an example of the targeted delivery of the wax emulsion additive described above, it has been found that mixing a first batch of additive to the gypsum slurry mixture in pin mixer 30 in the ration of, for example, 60 lbs./Msf Additive wax emulsion per batch of slurry mixture, and adding 5 lbs. Additional wax emulsion directly to the dense slurry mixtures 38, 138 at the pipes 34, 134, as described above, will result in lesser water resistance characteristics in the core layer, but in much greater water resistance in the two surface layers of gypsum that encase the fiber mats 14, 114, because of the smaller proportion of dense slurry to core slurry that is delivered to the gypsum board line. This results in a product that is lighter in weight, and is significantly better able to repel water or moisture from the surface layers, where this property is most needed, than is a standard, non-targeted process that would utilize additive in the amount of 70 lbs. Per batch evenly spread across all three layers.

Referring again to FIGS. 6 and 7, the configuration shown provides for the tip 2 of nozzle 226, including additive outlet opening 228, to be flush with the inside wall of the pipe 34, In this way, the turbulator 220 does not disturb the slurry stream, but nevertheless injects the additive (wax emulsion) into the slurry 38 as it is transported therethrough. Because of the continual fluid pressure provided by the pump 198, a vortex of additive wax emulsion is produced in the slurry stream which ensures more even mixing. Moreover, use of a positive displacement pump, so as to avoid pulsations in the additive delivery, produces more even mixing results.

However, the position of the nozzle tip may also be more actively disposed to extend beyond the inner surface of the wall of the pipe 34, and the additive outlet opening 228 is disposed in the slurry stream and so to inject the additive more forcefully into slurry mix to obtain a more robust mixing. However, care must be taken to avoid damage to the nozzle 226, since the gypsum slurry is being transported very rapidly through the pipe 34. This configuration may be used together with the angled nozzle, described above, in which the nozzle tip is angled at an acute angle with the flow of the gypsum slurry, so as to minimize the risk of damage.

The quick connect coupling 210 is attached at the narrowed 209 of the housing 206 to the nut 204, and at the distal larger end 208 to the receiving neck 234, shown as a hexagonal housing, but capable of being almost any geometrical shape. When attaching the additive delivery system 200, care must be taken so that the nozzle 226 is not damaged. Once the housing 206 is in place and engaged with the receiving neck 234, the handles 222 are rotated in the upward direction, which locks the system in place. Simultaneously, the locking action of the handles 222 also extends the nozzle 226 downwardly toward the pipe 34 until the nozzle additive output opening 228 is flush with the inner wall surface of the pipe 34. The port 186 is enclosed by a port enclosure 236 that is connected onto the pipe to hermetically seal the port 186, preferably by welding or other appropriate means. An optional nut 238, and a transitional pipe connector 239 are shown in FIG. 6, but these are not necessary if a dedicated additive port 186 is provided in the gypsum board line.

Additional modifications are also possible in the event that a dedicated additive outlet port 186 is provided. For example, vanes (not shown) or other means may be attached to the inner wall of pipe 34 or to the end of the nozzle 226, for directing the flow of gypsum slurry around the outlet port 186 so as to avoid fluid pressure of the moving gypsum slurry stream being directed onto the nozzle, which because of its shape and size may be then better able to withstand that pressure.

It is advantageous and preferable that the additive be applied within the dense gypsum slurry so as to avoid further dispersion thereof, for example, if the additive were simply sprayed over the surface. In such an example, the water film provided over the surface of the gypsum board at the point in the gypsum board formation process, known in the gypsum board industry, may further disperse the additive if applied on the surface only. At this point, there is a measure of control that can be provided over the board manufacturing process by introducing formulation additives to increase or decrease the speed of recrystallization of the gypsum form solution or slurry form.

Ideally, either the polymer additive or the wax emulsion in the gypsum slurry solution may be used to enhance the bonding strength also between the core slurry 44 and the outer surface dense slurries 38, 138 and between the dense slurry that extends across and through the mats of the glass fiber facing sheets 14 and 114'. The polymer may be generating a polymer matrix that extends from the junction of the lower density core slurry and into the dense slurry layers 38, 138, which have penetrated through the sheets 14, 114, and to extend to the gypsum board surface. The polymer matrix is effectively embedded within the gypsum base and provides a coalescing surface upon which further finishing can be based, e.g., painting or a water impervious acrylic cover, that may be added at this stage of the finishing process, for example, by spray coating.

The surface texture of the front face of the completed gypsum board may additionally include these additives, which as a part of the underlying matrix, help present a smooth dense layer of gypsum to which other polymeric, e.g., acrylic, compounds can adhere. As the dense slurry layer cures, for example, in the drying process, it hardens to provide a stiff surface capable of retaining a load and repelling water. The surface having the polymer additive, improves water resistance and the other additives may provide specific sites for chemical adhesion by other polymers. The composition of a water resistant or impervious coating can additionally comprise one or a combination of the following polymeric compounds: polyacrylamide, polymethylacrylamide, polyvinylidene chloride (PVDC), polyamide, poly (hexamethylene adipamide), polyvinylchloride (PVC), polyethylene, cellulose acetate, polyisobutylene, polycarbonate, polypropylene, polystyrene, styrene, butadiene, styrene butadiene copolymer, polychloroprene, styrene, butadiene (Neoprene®), natural rubber, poly (2,6 dimethyl pentene oxide), poly (4-methyl-1-pentene) (Teflon®), natural rubber, poly (2,6 dimethyl pentene oxide), poly 4, methyl pentene-1 and polydimethyl siloxane, and may be used in either or both of the dense slurry layers, and in different concentrations even in the core gypsum layer.

Testing of the gypsum board products comparing those with the wax emulsion additive and those without, revealed a significant increase in water resistance, especially when utilized with other water resistant additives in the core and modified dense gypsum slurry layers. The testing results of samples indicate an average increase in water resistance of at least 300%, and certainly, meeting and exceeding the minimum requirements and standards promulgated by the Canadian Construction Materials Center. The data appears to provide support to the theory of better dispersion across the complete surface of the board, thereby enhancing performance of the surface of the dense slurry layer. Additional benefits may be obtained by varying the wax emulsion or other compounds used, or a combination of compositions, or varying other parameters such as the solution strength, the application rate and the time and condones of curing, so as to increase the final gypsum board product's water resistance and other desirable characteristics.

This invention has been described with reference to the above-disclosed embodiments. Modifications and alterations of the disclosed embodiments are within the ability of persons having ordinary skill in the gypsum board art, and this invention is not intended to be limited to the description of the disclosed embodiments, the invention being limited only by the following claims and equivalents thereof.

What is claimed is:

1. A method of manufacture of gypsum board having fiber face sheets, comprising:

providing a first gypsum slurry having a first consistency continuously passing through a first gypsum slurry transport receptacle;

providing an in-line gypsum slurry transport receptacle having a discrete point of fluid communication with the first gypsum slurry transport receptacle;

receiving and transporting through said in-line gypsum slurry transport receptacle a stream of said first gypsum slurry and simultaneously modifying said first gypsum slurry in said in-line gypsum slurry transport receptacle after said discrete point to obtain a second gypsum slurry having a second consistency;

modifying the first gypsum slurry by homogeneously mixing an additive into said first gypsum slurry in the first gypsum slurry transport receptacle after said discrete point;

depositing a predetermined amount of said modified first gypsum slurry onto at least one first continuous fiber face sheet;

transporting said first continuous fiber face sheet, with said modified first aypsum slurry impregnated therein, through a second gypsum slurry application station;

depositing said second gypsum slurry onto said first fiber face sheet at said second gypsum slurry application station, thereby causing said second gypsum slurry to be essentially evenly distributed over an upwardly facing top surface of said first fiber face sheet.

2. The method of manufacture of gypsum board according to claim 1 wherein a second in-line gypsum slurry transport receptacle is provided for receiving and transporting a third gypsum slurry, said step of homogeneously mixing an additive into said first, gypsum slurry further comprises mixing a wax emulsion into said first, gypsum slurry.

3. The method of manufacture of gypsum board according to claim 2 wherein said wax emulsion is added to the continuous stream of gypsum slurry by injecting it thereinto through a turbulator device disposed in-line with a fluid feed in fluid communication with said in-line gypsum slurry transport receptacle after the discrete point of coonnection with the first gypsum slurry transport receptacle.

4. The method of manufacture of gypsum board according to claim 1 wherein a third gypsum slurry and a second continuous fiber face sheet are provided, and said step of modifying said first gypsum slurry by homogenously mixing an additive into said first gypsum slurry is also performed on the third gypsum slurry; and a predetermined amount of said modified said third gypsum slurry is deposited onto the second continuous fiber face sheet.

5. The method of manufacture of gypsum board according to claim 1, wherein the step of depositing the second gypsum slurry is preceded by a step of homogeneously mixing an additive into the first gypsum slurry via a fluid feed in fluid communication with said in-line gypsum slurry transport receptacle.

6. The method of manufacture of gypsum board according to claim 5 wherein said additive is transported through the fluid feed by impelling it to move through the fluid feed by a positive displacement pump.

7. The method of manufacture of gypsum board according to claim 1 wherein mixing of the additive into the first gypsum slurry further comprises utilizing a turbulator device after the discrete point to inject the additive into the slurry stream of the first gypsum slurry being transported through the in-line gypsum slurry transport receptacle.

8. The method of manufacture of gypsum board according to claim 1 wherein providing at least one first continuous fiber sheet further includes providing a fiber sheet incorporating randomly aligned, inorganic glass fibers having random interstices between said inorganic fibers, so that depositing said predetermined amount of said first gypsum slurry onto the first continuous inorganic fiber face sheet causes the first modified gypsum slurry having a first consistency to penetrate through said random interstices between the inorganic fibers and to thereby coat both top and bottom surfaces of said first inorganic fiber sheet with said first gypsum slurry having a first consistency.

9. The method of manufacture of gypsum board according to claim 1 further comprising providing a third gypsum slurry having a third consistency and depositing it onto a second continuous fiber sheet having top and bottom surfaces, whereby said top surface of said second fiber sheet is coated with said third gypsum slurry.

10. The method of manufacture of gypsum board according to claim 9 including a step of applying said second fiber sheet onto the second gypsum slurry thereby sheathing said second first gypsum slurry within said first and second fiber sheets to form a wet gypsum board product.

11. The method of manufacture of gypsum board according to claim 9 wherein the second gypsum slurry and the third gypsum slurry are extracted from the first gypsum slurry transport receptacle and both modified prior to application on the first and second continuous fiber sheets, wherein both the second gypsum slurry and the third gypsum slurry have a similar consistency.

12. The method of manufacture of gypsum board according to claim 1 wherein said step of mixing an additive into said first, gypsum slurry further comprises mixing a material that can be solubilized or dispersed in a liquid media that is then injected into said first, gypsum slurry.

13. The method of manufacture of gypsum board according to claim 1 wherein said step of mixing an additive into said first, gypsum slurry further comprises mixing one or more materials taken from the group consisting of polymers, boric acid, borates, intumescenee-like additives, surfactants, dispersants, retarders, potash, silicates, starches, phosphates, perlite, alumina into said first, gypsum slurry after the first gypsum slurry passes the discrete point and is in the in-line gypsum slurry transport receptacle.

14. The method of manufacture of gypsum board according to claim 1 wherein said step of providing a first continuous fiber face sheet further comprises providing a mineral fiber facing sheet, and wherein the second gypsum slurry is forced into interstices between the mineral fibers comprising said sheet.

15. The method of manufacture of gypsum board according to claim 1 wherein said step of providing a first continuous fiber face sheet further comprises providing a first face sheet including paper, and wherein the second gypsum slurry is forced into the interstices between the paper fibers comprising said sheet.

16. The method of manufacture of gypsum board according to claim 1 wherein said step of providing a first continuous fiber face sheet further comprises providing a first face sheet including a plurality of randomly aligned glass reinforcing fibers pressed into a sheet, and wherein the first gypsum slurry is forced into interstices between the fibers comprising said sheet.

17. The method for manufacture of gypsum board according to claim 1, further comprising modification of the first gypsum slurry by addition of a foaming additive therein to provide the second gypsum slurry after the discrete point and prior to depositing said first gypsum slurry from said first gypsum slurry transport receptacle onto said first fiber face sheet.

18. A method for manufacture of gypsum board having fiber face sheets, comprising the steps of:

providing a first gypsum slurry transport receptacle for mixing a first gypsum slurry having a first consistency;

providing a second in-line gypsum slurry transport receptacle in fluid communication at a discrete point with the first gypsum slurry transport receptacle; p1 receiving in said second in-line gypsum slurry transport receptacle a stream of said first gypsum slurry passing through the discrete point from said first gypsum slurry transport receptacle;

modifying the first gypsum slurry after it has passed through the discrete point so as to provide a second gypsum slurry having a second consistency;

depositing a predetermined amount of one of said first or second gypsum slurries onto at least a first continuous fiber face sheet;

transporting said first continuous fiber sheet through a gypsum slurry deposition station;

depositing the one of said first or second gypsum slurries onto said first fiber face sheet and depositing said other of said first or second gypsum slurries over the combination of first fiber sheet and the one of said first or second gypsum slurries to essentially evenly distribute the other of said first or second gypsum slurries over an upwardly facing top surface of said first fiber face sheet;

further modifying one of said first or second slurries by homogeneously mixing an additive therein.

19. The method of manufacture of gypsum board according to claim 18 wherein the first depositing step further comprises depositing a predetermined amount of first gypsum slurry onto the first continuous fiber face sheet so as to impregnate the first continuous fiber face sheet with said first gypsum slurry;

the second depositing step further comprises depositing the second gypsum slurry onto said combination of first fiber face sheet and impregnated first gypsum slurry and causing said second gypsum slurry to be essentially evenly distributed over an upwardly facing top surface of said first fiber face sheet;

wherein the additive is homogeneous mixed into said first slurry in the first gypsum slurry transport receptacle after the discrete point and prior to depositing the first gypsum slurry onto said first fiber face sheet.

20. The method of manufacture of gypsum board according to claim 18, wherein the step of homogeneously mixing an additive into the first gypsum slurry is performed during a fluid feed of a batch of said first gypsum slurry into said second in-line gypsum slurry transport receptacle.

21. The method of manufacture of gypsum board according to claim 20 wherein additive is homogeneously mixed into the first gypsum slurry by utilizing a turbulator device to inject the additive into the slurry stream being transported through said second in-line gypsum slurry transport receptacle after the discrete step and before depositing the first gypsum slurry onto the first continuous fiber sheet.

22. The method of manufacture of gypsum board according to claim 20 wherein a third gypsum slurry is obtained by homogeneously mixing of the additive into said first gypsum slurry by utilizing a turbulator device to inject the additive into the slurry stream being transported through a third in-line gypsum slurry transport receptacle before depositing it onto a second continuous fiber sheet.

23. The method of manufacture of gypsum board according to claim 18 wherein additive is homogeneously mixed into the first gypsum slurry by utilizing a turbulator device to inject the additive into the slurry stream being transported through said second in-line gypsum slurry transport receptacle after the discrete step and before depositing the first gypsum slurry onto the first continuous fiber sheet.

24. The method of manufacture of gypsum board according to claim 18 wherein the one of said first or second gypsum slurries is the first gypsum slurry on which said modification to the second gypsum slurry is performed before the second gypsum slurry is deposited onto a second fiber face sheet; and after said second gypsum slurry is essentially evenly distributed over the upwardly facing top surface of said first fiber face sheet and the first gypsum slurry is deposited onto and is essentially evenly distributed over said first fiber face sheet, the second fiber face sheet is then applied onto the evenly distributed first gypsum slurry to form a layered gypsum board device.

25. A method for manufacture of gypsum board having fiber face sheets, comprising the steps of:

providing a first gypsum slurry having a first consistency continuously passing through a first gypsum slurry transport receptacle;

providing an in-line gypsum slurry transport receptacle in fluid communication at a discrete point with the first gypsum slurry transport receptacle;

modifying the first gypsum slurry by homogeneously mixing an additive therein after the discrete point;

depositing a predetermined amount of said first gypsum slurry onto at least one first continuous fiber face sheet;

receiving and transporting in said in-line gypsum slurry transport receptacle a continuous stream of said first gypsum slurry;

homogeneously mixing an additive into said first gypsum slurry while it is being transported in said first gypsum slurry transport receptacle to obtain a second gypsum slurry having the additive entrained therein, said additive causing the second gypsum slurry to have a second consistency;

transporting said first continuous fiber face sheet, with said first gypsum slurry thereon, through a gypsum slurry application station;

depositing said second gypsum slurry from said first gypsum slurry transport receptacle onto said first fiber face sheet, thereby causing said first gypsum slurry to be essentially evenly distributed over an upwardly facing top surface of said first fiber face sheet.

26. The method for manufacture of gypsum board according to claim 25, further comprising modification of the first gypsum slurry by addition of a foaming additive therein to provide a less dense second gypsum slurry prior to depositing said second gypsum slurry from said first gypsum slurry transport receptacle onto said first fiber face sheet.

* * * * *